(12) United States Patent
Imamura et al.

(10) Patent No.: US 9,831,014 B2
(45) Date of Patent: Nov. 28, 2017

(54) HEAT-RESISTANT ELECTRIC WIRE

(71) Applicant: DAIKIN INDUSTRIES, LTD., Osaka-shi, Osaka (JP)

(72) Inventors: Hitoshi Imamura, Osaka (JP); Takahisa Aoyama, Osaka (JP); Hideki Kono, Osaka (JP); Tatsuya Funaoka, Osaka (JP); Hirokazu Itou, Osaka (JP); Junya Iida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/108,104

(22) PCT Filed: Dec. 19, 2014

(86) PCT No.: PCT/JP2014/083680
§ 371 (c)(1),
(2) Date: Jun. 24, 2016

(87) PCT Pub. No.: WO2015/104974
PCT Pub. Date: Jul. 16, 2015

(65) Prior Publication Data
US 2016/0322128 A1    Nov. 3, 2016

(30) Foreign Application Priority Data
Jan. 8, 2014   (JP) .................. 2014-002027

(51) Int. Cl.
| H01B 7/29 | (2006.01) |
| C08J 3/28 | (2006.01) |
| H01B 7/02 | (2006.01) |
| C09D 127/18 | (2006.01) |
| H01B 13/14 | (2006.01) |
| H01B 3/44 | (2006.01) |

(52) U.S. Cl.
CPC .............. H01B 7/292 (2013.01); C08J 3/28 (2013.01); C09D 127/18 (2013.01); H01B 3/445 (2013.01); H01B 3/448 (2013.01); H01B 7/0275 (2013.01); H01B 13/14 (2013.01); *C08J 2327/18* (2013.01)

(58) Field of Classification Search
CPC ........ H01B 3/445; H01B 3/448; H01B 13/14; C09D 127/18; C08J 3/28
See application file for complete search history.

(56) References Cited

U.S. PATENT DOCUMENTS

| 5,089,200 A | 2/1992 | Chapman, Jr. et al. |
| 2005/0070637 A1 | 3/2005 | Nishibayashi et al. |
| 2007/0106026 A1 | 5/2007 | Namura |
| 2009/0038821 A1 | 2/2009 | Sato et al. |
| 2016/0319089 A1 | 11/2016 | Imamura et al. |

FOREIGN PATENT DOCUMENTS

| CN | 101364456 A | 2/2009 |
| JP | 52-98761 A | 8/1977 |
| JP | 03-505347 A | 11/1991 |
| JP | 04-501393 A | 3/1992 |
| JP | 05-057778 A | 3/1993 |
| JP | 05-502899 A | 5/1993 |
| JP | 05-214029 A | 8/1993 |
| JP | 07-037439 A | 2/1995 |
| JP | 09-245526 A | 9/1997 |
| JP | 11-049867 A | 2/1999 |
| JP | 11-349711 A | 12/1999 |
| JP | 2000-186162 A | 7/2000 |
| JP | 2002-030166 A | 1/2002 |
| JP | 2002-172702 A | 6/2002 |
| JP | 2002-327068 A | 11/2002 |
| JP | 2005-320497 A | 11/2005 |
| JP | 2007-126631 A | 5/2007 |
| JP | 2007-131671 A | 5/2007 |
| JP | 2007-137982 A | 6/2007 |
| JP | 2008-231330 A | 10/2008 |
| JP | 2008-231331 A | 10/2008 |
| JP | 2010-123461 A | 6/2010 |
| JP | 2010-155443 A | 7/2010 |
| JP | 2011-105012 A | 6/2011 |
| JP | 2011-213894 A | 10/2011 |
| JP | 2014-028953 A | 2/2013 |
| WO | 91/04842 A1 | 4/1991 |
| WO | 91/05021 A1 | 4/1991 |
| WO | 91/18930 A1 | 12/1991 |
| WO | 03/051999 A1 | 6/2003 |
| WO | 2014/007350 | 1/2014 |

OTHER PUBLICATIONS

English Translation of International Preliminary Report on Patentability in International Appln. No. PCT/JP2014/083686 dated Jul. 12, 2016.
English Translation of International Preliminary Report on Patentability in International Appln. No. PCT/JP2014/083680 dated Jul. 12, 2016.
International Search Report of PCT/JP2014/083680 dated Mar. 17, 2015.
International Search Report of PCT/JP2014/083686 dated Feb. 24, 2015.
Communication dated Jun. 19, 2017 issued by the European Patent Office in counterpart European Application No. 14878221.2.
Database WPI, Week 200944, Thomson Scientific, London, GB; AN 2009-K73135, XP002770750, Jun. 25, 2009 (2 pages total).
An Office Action dated Jul. 26, 2017, which issued during the prosecution of U.S. Appl. No. 15/108,090.

*Primary Examiner* — Timothy Thompson
*Assistant Examiner* — Amol Patel
(74) *Attorney, Agent, or Firm* — Sughrue Mion, PLLC

(57) ABSTRACT

A heat-resistant electric wire including a core wire and a coating that covers the core wire. The coating is formed from a modified fluorine-containing copolymer that is obtained by irradiating a copolymer with radiation at an exposure of 250 kGy or lower at a temperature of not higher than the melting point of the copolymer. The copolymer is at least one copolymer selected from a copolymer including a tetrafluoroethylene unit and a perfluoro(alkyl vinyl ether) unit and a copolymer including a tetrafluoroethylene unit and a hexafluoropropylene unit.

3 Claims, No Drawings

HEAT-RESISTANT ELECTRIC WIRE

CROSS REFERENCE TO RELATED APPLICATIONS

This application is a National Stage of International Application No. PCT/JP2014/083680 filed Dec. 19, 2014, claiming priority based on Japanese Patent Application No. 2014-002027 filed Jan. 8, 2014, the contents of all of which are incorporated herein by reference in their entirety.

TECHNICAL FIELD

The present invention relates to heat-resistant electric wires.

BACKGROUND ART

Known electric wires used in high-temperature atmospheres include electric wires whose core wires are coated with any of polyimides, tetrafluoroethylene/perfluoro(alkyl vinyl ether) copolymers, and polytetrafluoroethylene.

For example, Patent Literature 1 discloses a heat-resistant insulated electric wire including an insulation layer prepared by applying and sintering a polyimide coating that is obtained by reacting 3,3',4,4'-biphenyl tetracarboxylic dianhydride, p-phenylenediamine, and 4,4'-diaminodiphenyl ether.

Patent Literature 2 discloses an electric wire including a polytetrafluoroethylene coating wherein the coating body partially includes a stripe of another polytetrafluoroethylene having different properties in the longitudinal direction.

Patent Literature 3 discloses a coated electric wire including a core wire coated with a molded tetrafluoroethylene copolymer including tetrafluoroethylene and a perfluoro (alkyl vinyl ether), wherein the copolymer has 10 to 100 functional groups per $10^6$ carbon atoms, with the number of —COF and/or —COOH among the functional groups being 10 to 100 in total per $10^6$ carbon atoms.

CITATION LIST

Patent Literature

Patent Literature 1: JP H07-37439 A
Patent Literature 2: JP H05-57778 A
Patent Literature 3: JP 2005-320497 A

SUMMARY OF INVENTION

Technical Problem

However, polyimides unfortunately have insufficient incombustibility and are impossible to extrude into coats. Tetrafluoroethylene/perfluoro(alkyl vinyl ether) copolymers are possible to extrude into coats, but they have insufficient heat resistance and crack resistance. Polytetrafluoroethylene is excellent in heat resistance, but it is impossible to extrude into coats.

In consideration of the above state of the art, the present invention aims to provide an electric wire that is capable of being produced by extrusion molding and is excellent in heat resistance and crack resistance.

Solution to Problem

Specifically, the present invention relates to a heat-resistant electric wire including a core wire and a coating that covers the core wire, the coating being formed from a modified fluorine-containing copolymer that is obtained by irradiating a copolymer with radiation at an exposure of 250 kGy or lower at a temperature of not higher than the melting point of the copolymer, the copolymer being at least one copolymer selected from the group consisting of a copolymer including a tetrafluoroethylene unit and a perfluoro (alkyl vinyl ether) unit and a copolymer including a tetrafluoroethylene unit and a hexafluoropropylene unit.

The copolymer is preferably a copolymer including a tetrafluoroethylene unit and a perfluoro(alkyl vinyl ether) unit.

The copolymer including a tetrafluoroethylene unit and a perfluoro(alkyl vinyl ether) unit preferably includes 1.0 to 12 mass % of the perfluoro(alkyl vinyl ether) unit in all the monomer units.

The present invention also relates to a method of producing the above heat-resistant electric wire, including extrusion-molding, on the core wire, at least one copolymer selected from the group consisting of a copolymer including a tetrafluoroethylene unit and a perfluoro(alkyl vinyl ether) unit and a copolymer including a tetrafluoroethylene unit and a hexafluoropropylene unit to provide a coating that covers the core wire, and irradiating the coating with radiation.

The coating preferably further contains polytetrafluoroethylene.

Advantageous Effects of Invention

The heat-resistant electric wire of the present invention is excellent in heat resistance, and is capable of maintaining the shape thereof even at a temperature of not lower than the melting point of the coating material. The wire of the invention is also excellent in crack resistance, and thus is capable of being produced easily by extrusion molding.

DESCRIPTION OF EMBODIMENTS

The present invention will be described in detail below.

The heat-resistant electric wire of the present invention includes a core wire and a coating that covers the core wire. The coating is formed from a modified fluorine-containing copolymer that is obtained by irradiating a copolymer with radiation at an exposure of 250 kGy or lower at a temperature of not higher than the melting point of the copolymer.

In conventional techniques, coatings may be deformed due to melt flow or peeled off at temperatures around the melting point, so that the performance of the electric wires may be impaired. On the contrary, the present invention enables production of a heat-resistant electric wire that is not easily deformed due to melt flow even at a temperature of not lower than the melting point of the material copolymer by irradiating the copolymer with radiation at an exposure of 250 kGy or lower at a temperature of not higher than the melting point. Thus, the wire of the invention can be used at higher temperatures than conventional fluororesin-coated electric wires.

The copolymer is at least one copolymer selected from the group consisting of a copolymer including a tetrafluoroethylene unit (TFE unit) and a perfluoro(alkyl vinyl ether) unit (PAVE unit) (hereinafter, referred to as a TFE/PAVE copolymer) and a copolymer including a TFE unit and a hexafluoropropylene unit (HFP unit) (hereinafter, referred to as a TFE/HFP copolymer).

For excellent heat resistance and crack resistance, the copolymer is preferably a copolymer including a TFE unit and a PAVE unit, more preferably at least one copolymer selected from the group consisting of copolymers including a TFE unit and a PAVE unit and copolymers including a TFE unit, a HFP unit, and a PAVE unit, still more preferably a copolymer consisting only of a TFE unit and a PAVE unit.

The PAVE constituting the TFE/PAVE copolymer may be at least one selected from the group consisting of those represented by the following formula (1):

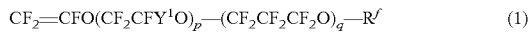

(wherein $Y^1$ is F or $CF_3$; $R^f$ is a C1-C5 perfluoroalkyl group; p is an integer of 0 to 5; and q is an integer of 0 to 5) and those represented by the following formula (2):

(wherein Xs may be the same as or different from each other, and are each H, F, or $CF_3$; $R^1$ is a linear or branched C1-C6 fluoroalkyl group which may optionally have one or two atom(s) that is/are at least one selected from the group consisting of H, Cl, Br, and I, or a C5-C6 cyclic fluoroalkyl group which may optionally have one or two atom(s) that is/are at least one selected from the group consisting of H, Cl, Br, and I).

The PAVE is preferably one having a bulky side chain, specifically preferably perfluoro(propyl vinyl ether) (PPVE).

The TFE/PAVE copolymer preferably includes 1.0 to 12 mass % of a polymerized unit based on PAVE in all the polymerized units.

The amount of the polymerized unit based on PAVE in all the polymerized units is more preferably 2.0 mass % or more, still more preferably 3.5 mass % or more, particularly preferably 4.0 mass % or more, most preferably 5.0 mass % or more, whereas the amount thereof is more preferably 8.0 mass % or less, still more preferably 7.0 mass % or less, particularly preferably 6.5 mass % or less, most preferably 6.0 mass % or less.

The amount of the polymerized unit based on PAVE is determined by $^{19}$F-NMR.

The TFE/PAVE copolymer preferably has a melting point of 280° C. to 322° C.

The melting point is more preferably 290° C. or higher and more preferably 315° C. or lower.

The melting point is a temperature corresponding to the maximum value on a heat-of-fusion curve obtained using a differential scanning calorimeter (DSC) at a temperature-increasing rate of 10° C./min.

The TFE/PAVE copolymer preferably has a glass transition temperature (Tg) of 70° C. to 110° C.

The glass transition temperature is more preferably 80° C. or higher and more preferably 100° C. or lower.

The glass transition temperature is a value obtained by dynamic viscoelasticity measurement.

The TFE/PAVE copolymer may be produced by any conventionally known method, such as a method in which monomers to give constitutional units of the copolymer and additives such as a polymerization initiator are appropriately mixed and the monomers are emulsion polymerized or suspension polymerized, for example.

The TFE/HFP copolymer includes a tetrafluoroethylene (TFE) unit and a hexafluoropropylene (HFP) unit.

The TFE/HFP copolymer preferably satisfies a mass ratio (TFE/HFP) between the TFE unit and the HFP unit of (70 to 99)/(1 to 30) (mass %).

The copolymer having a mass ratio within the above range can provide a modified fluororesin mixture having excellent crack resistance.

The mass ratio (TFE/HFP) is more preferably (85 to 95)/(5 to 15) (mass %).

The TFE/HFP copolymer preferably further includes a perfluoro(alkyl vinyl ether) (PAVE) unit. The copolymer further including a PAVE unit can further improve the crack resistance.

Examples of the PAVE unit contained in the TFE/HFP copolymer include the same units as for the PAVE unit constituting the above TFE/PAVE copolymer.

In order to excellently improve the crack resistance, PPVE is more preferred.

The aforementioned TFE/PAVE copolymer includes no HFP unit, and thus is different from a TFE/HFP/PAVE copolymer in this respect.

If the TFE/HFP copolymer is a copolymer including a TFE unit, a HFP unit, and a PAVE unit (hereinafter, also referred to as a "TFE/HFP/PAVE copolymer"), the mass ratio (TFE/HFP/PAVE) is preferably (70 to 99.8)/(0.1 to 25)/(0.1 to 25) (mass %). The copolymer having a mass ratio within the above range is excellent in heat resistance and chemical resistance.

The mass ratio (TFE/HFP/PAVE) is more preferably (75 to 98)/(1.0 to 15)/(1.0 to 10) (mass %).

The TFE/HFP/PAVE copolymer includes 1 mass % or more in total of the HFP unit and the PAVE unit in all the monomer units.

The TFE/HFP/PAVE copolymer preferably includes 25 mass % or less of the HFP unit in all the monomer units.

The copolymer including the HFP unit in an amount within the above range can provide a fluororesin molded article having excellent heat resistance.

The amount of the HFP unit is more preferably 20 mass % or less, still more preferably 18 mass % or less. The amount thereof is particularly preferably 15 mass % or less. The amount of the HFP unit is preferably 0.1 mass % or more, more preferably 1 mass % or more. The amount thereof is particularly preferably 2 mass % or more.

The amount of the HFP unit can be determined by $^{19}$F-NMR.

The amount of the PAVE unit is more preferably 20 mass % or less, still more preferably 10 mass % or less. The amount thereof is particularly preferably 3 mass % or less. The amount of the PAVE unit is preferably 0.1 mass % or more, more preferably 1 mass % or more. The amount of the PAVE unit can be determined by $^{19}$F-NMR.

The TFE/HFP copolymer may further include another ethylenic monomer (a) unit.

The ethylenic monomer (a) may be any monomer unit copolymerizable with the TFE unit, the HFP unit, and the PAVE unit. Examples thereof include ethylenic fluoromonomers such as vinyl fluoride (VF), vinylidene fluoride (VdF), chlorotrifluoroethylene (CTFE), and ethylene (ETFE), and non-fluorinated ethylenic monomers such as ethylene, propylene, and alkyl vinyl ethers.

If the copolymer is a copolymer of TFE/HFP/PAVE/ ethylenic monomer (a), the mass ratio (TFE/HFP/PAVE/ ethylenic monomer (a)) is preferably (70 to 98)/(0.1 to 25)/(0.1 to 25)/(0.1 to 25) (mass %).

The TFE/HFP copolymer includes 1 mass % or more in total of the polymerized units other than the TFE unit in all the monomer units.

The TFE/HFP copolymer preferably has a melting point of 200° C. to 322° C. If the melting point is lower than 200° C., the effect of irradiation may not be sufficiently achieved. If the melting point is higher than 322° C., main-chain scission may occur so that the polymer may be divided into low-molecular-weight molecules, and thus the mechanical strength may be greatly deteriorated. The melting point is more preferably 220° C. or higher, whereas the melting point is more preferably 300° C. or lower, still more preferably 280° C. or lower.

The melting point is a temperature corresponding to the maximum value on a heat-of-fusion curve obtained using a differential scanning calorimeter (DSC) at a temperature-increasing rate of 10° C./min.

The TFE/HFP copolymer preferably has a glass transition temperature (Tg) of 60° C. to 110° C.

The glass transition temperature is more preferably 65° C. or higher and more preferably 100° C. or lower.

The glass transition temperature is a value obtained by dynamic viscoelasticity measurement.

The TFE/HFP copolymer may be produced by any conventionally known method, such as a method in which monomers to give constitutional units of the copolymer and additives such as a polymerization initiator are appropriately mixed and the monomers are emulsion polymerized, solution polymerized, or suspension polymerized, for example.

The copolymer may also preferably include the TFE/PAVE copolymer and the TFE/HFP copolymer. In other words, the TFE/PAVE copolymer and the TFE/HFP copolymer may be used in admixture. The mass ratio ((A)/(B)) between the TFE/PAVE copolymer (A) and the TFE/HFP copolymer (B) is preferably 1/9 to 7/3. The copolymers mixed in the ratio within the above range can provide a modified fluororesin mixture having excellent crack resistance.

The mass ratio is more preferably 5/5 to 2/8. Containing a higher proportion of the TFE/HFP copolymer, which generally has poor crack resistance, than that of the TFE/PAVE copolymer, the mixture can provide a material having the properties derived from the TFE/HFP copolymer, such as high insulation, while having greatly improved crack resistance (i.e., the crack resistance of the TFE/HFP copolymer, which has been desired to be improved, is greatly improved).

The above fluororesin mixture is preferably prepared by any known method such as a method in which two or more of the fluororesins having different melting points are melt-mixed (melt-kneaded) or a method in which resin dispersions after emulsion polymerization are mixed, the resins are coagulated with an acid such as nitric acid, and the coagulated resins are collected. The melt-mixing can be performed at a temperature of not lower than the highest melting point among the melting points of the fluororesins.

The copolymer preferably has a melt flow rate (MFR) at 372° C. of 0.1 to 100 g/10 min. The copolymer having a MFR within the above range enables a significant effect of irradiation.

The MFR is more preferably 0.5 g/10 min or more, whereas it is more preferably 80 g/10 min or less, still more preferably 40 g/10 min or less. The MFR is a value determined as the mass (g/10 min) of the polymer flowed out of a nozzle (inner diameter: 2 mm, length: 8 mm) per 10 minutes at 372° C. and 5 kg load using a melt indexer (Yasuda Seiki Seisakusho Ltd.) in conformity with ASTM D1238.

The copolymer preferably has 10 to 10000 functional groups per $10^6$ carbon atoms. The number of functional groups is more preferably 100 or more per $10^6$ carbon atoms, while the number of functional groups is more preferably 9000 or less, still more preferably 1000 or less. Too small a number of functional groups fail to sufficiently improve the crack resistance and the heat resistance. Too large a number of functional groups may cause difficulty in molding.

The functional groups include a functional group present at an end of the main chain or at an end of a side chain of the copolymer and a functional group present in the main chain or in a side chain.

The functional group present in the main chain is a functional group that directly bonds to a carbon atom of the main chain.

The functional group present in a side chain is a functional group that is present in a side chain but not at an end of the side chain.

The functional groups are each preferably a functional group present at an end of the main chain or at an end of a side chain of the copolymer.

Preferably, the functional groups are considered to be easily formed into reactive sites that effectively form cross-linking reactions by radiation and effectively act as cross-linking sites between copolymers.

The functional groups preferably include at least one selected from the group consisting of —CF=CF$_2$, —CF$_2$H, —COF, —COOH, —COOCH$_3$, —CONH$_2$, and —CH$_2$OH.

The functional groups more preferably include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

The functional groups still more preferably include at least one selected from the group consisting of —CF$_2$H, —COF, —COOH, and —CH$_2$OH. The functional groups are particularly preferably —CH$_2$OH.

—CH$_2$OH is favored because it is easily introduced to an end of the main chain by adding methanol as a chain-transfer agent for adjusting the molecular weight in production of the copolymer.

The functional groups may include at least one selected from the group consisting of —CH$_2$—, —CH$_3$, —CH$_2$CH$_3$, —CN, —OCH$_3$, and —SO$_3$H.

Methods of introducing the functional groups into a copolymer are known. Examples thereof include a method of using a chain-transfer agent in polymerization of monomers and a method of using a polymerization initiator for starting polymerization. If methane or ethane is used as a chain-transfer agent, —CH$_3$ or —CH$_2$CH$_3$ is introduced into an end of the main chain of the copolymer. If an alcohol is used as a chain-transfer agent, —CH$_2$OH is introduced into an end of the main chain of the copolymer. —CH$_2$OH can also be introduced into an end of the main chain of the copolymer by the use of a peroxide having a —CH$_2$OH structure as a polymerization initiator. Using a persulfate as a polymerization initiator provides a copolymer having —COOH introduced to an end of the main chain. —COOH can be converted into —CONH$_2$ by bringing this copolymer into contact with ammonia.

Any of the above functional groups can also be introduced into an end of a side chain of the copolymer by polymerizing a monomer having a functional group. The monomer having a functional group is preferably a monomer having at least one selected from the group consisting of —CF=CF$_2$, —CF$_2$H, —COF, —COOH, —COOH$_3$, —CONH$_2$, and —CH$_2$OH, more preferably a monomer having at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably a monomer having at least one selected from the group consisting of —CF$_2$H, —COF, —COOH, and —CH$_2$OH, particularly preferably a monomer having —CH$_2$OH.

The monomer having a functional group may be a monomer having at least one selected from the group consisting of —CH$_2$—, —CH$_3$, —CH$_2$CH$_3$, —CN, —OCH$_3$, and —SO$_3$H.

The monomer having a functional group is preferably a monomer (x) represented by the following formula:

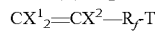

wherein X$^1$ and X$^2$ may be the same as or different from each other, and are each a hydrogen atom or a fluorine atom; R$_f$ is a C1-C40 divalent alkylene group, a C1-C40 fluorooxyalkylene group, a C2-C40 fluoroalkylene group having an ether bond, or a C2-C40 fluorooxyalkylene group having an ether bond; and T is any of the above functional groups.

T is preferably at least one selected from the group consisting of —CF=CF$_2$, —CF$_2$H, —COF, —COOH, —COOH$_3$, —CONH$_2$, and —CH$_2$OH, more preferably at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably —CH$_2$OH.

T may be at least one selected from the group consisting of —CH$_3$, —CH$_2$CH$_3$, —CN, —OCH$_3$, and —SO$_3$H.

The copolymer particularly preferably has a functional group at or in all the aforementioned sites, i.e., at an end of the main chain, at an end of a side chain, in the main chain, and in a side chain. Such a copolymer can be produced by, for example, polymerizing a monomer composition containing the monomer (x) with the use of a peroxide as a polymerization initiator.

The functional groups can be identified and the number of functional groups can be determined by infrared spectroscopy.

Specifically, the number of functional groups is determined by the following method.

First, the fluorine-containing copolymer is molten at 340° C. for 30 minutes, and then compression-molded into a film having a thickness of 0.25 to 0.3 mm. This film is analyzed by Fourier transform infrared spectroscopy, and thereby the infrared absorption spectrum of the fluorine-containing copolymer is obtained. Then, the difference spectrum is obtained between the infrared absorption spectrum and the base spectrum of a polymer that is completely fluorinated and is free from functional groups. With the absorption peak of a specific functional group appearing in this difference spectrum, the number N of the functional groups per 1×10$^6$ carbon atoms of the fluorine-containing copolymer is calculated according to the following formula (A):

$$N = I \times K/t \quad (A)$$

wherein
I: absorbance
K: correction coefficient
t: thickness of film (mm).

For reference, Table 1 shows the absorption frequencies, molar absorption coefficients, and correction coefficients of the functional groups mentioned herein. The molar absorption coefficients are determined from the FT-IR measurement data of a low-molecular-weight model compound.

TABLE 1

| Functional group | Absorption frequency (cm$^{-1}$) | Molar absorption coefficient (l/cm/mol) | Correction coefficient | Model compound |
|---|---|---|---|---|
| —COF | 1883 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

The absorption frequencies of —CH$_2$CF$_2$H, —CH$_2$COF, —CH$_2$COOH, —CH$_2$COOCH$_3$, and —CH$_2$CONH$_2$ are lower than the absorption frequencies of —CF$_2$H, —COF, —COOH free and —COOH bonded, —COOCH$_3$, and —CONH$_2$, shown in the table, by several tens of kaysers (cm$^{-1}$).

Thus, for example, the number of the functional groups —COF means the sum of the number of functional groups determined from the absorption peak at the absorption frequency 1883 cm$^{-1}$ assigned to —CF$_2$COF and the number of functional groups determined from the absorption peak at the absorption frequency 1840 cm$^{-1}$ assigned to —CH$_2$COF.

The copolymer may include 0.01 to 2 mass % of the polymerized unit based on the aforementioned monomer (x) relative to the sum of the polymerized units based on the monomers other than the monomer (x).

The copolymer is irradiated with radiation at a temperature of not higher than the melting point of the copolymer. The irradiation temperature is more preferably lower than the temperature that is 20° C. lower than the melting point of the copolymer. The irradiation temperature is also preferably 0° C. or higher, more preferably 25° C. or higher, still more preferably 80° C. or higher, particularly preferably 100° C. or higher. The irradiation temperature is also preferably 300° C. or lower, more preferably 270° C. or lower, particularly preferably 250° C. or lower.

The copolymer including a PAVE unit tends to improve the crack resistance and the heat resistance even if irradiated with radiation at a low temperature. This is presumably because a large number of large side chains, which are alkoxy groups, show a large molecular motion even at a low temperature, so that the effect of irradiation can be sufficiently achieved even at a low temperature. The copolymer is preferably a copolymer including a PAVE unit. The copolymer is particularly preferably a copolymer including a functional group at an end of the main chain, at an end of a side chain, and in the main chain or a side chain. Such a copolymer tends to improve the crack resistance and the heat resistance even if irradiated at a low temperature.

The irradiation temperature can be adjusted by any known method. Specific examples thereof include a method in which the copolymer is held in a heating furnace maintained at a predetermined temperature and a method in which the copolymer is placed on a hotplate, and then the hotplate is heated by applying an electric current to a built-in heater of the hotplate or by an external heater.

Examples of the radiation include electron beams, ultraviolet rays, gamma rays, X rays, neutron beams, and high energy ions. For excellent penetrability, a high dose rate, and suitable industrial productivity, electron beams are preferred.

The irradiation may be performed by any method, such as a method using a conventionally known irradiator.

The exposure of the radiation is 250 kGy or lower. The exposure of the radiation is preferably 10 kGy to 250 kGy. The radiation with an exposure of lower than 10 kGy may fail to sufficiently exert the effect of irradiation. The radiation with an exposure of higher than 250 kGy may cause main-chain scission so that the polymer may be divided into low-molecular-weight molecules, and thus the mechanical strength may be greatly deteriorated.

The exposure of the radiation is more preferably 20 kGy or higher, still more preferably 30 kGy or higher, whereas it is more preferably 100 kGy or lower, still more preferably 90 kGy or lower, particularly preferably 80 kGy or lower.

In the case that the copolymer is a TFE/PAVE copolymer, the number of functional groups is 100 or more, the irradiation temperature is 25° C. or higher, preferably 200° C. or higher, and the exposure is 20 to 40 kGy, the coating can have a melt-deforming temperature 70° C. to 80° C. or more higher than the melting point. Here, the melt-deforming temperature serves as an indicator of the heat resistance.

Also, in the case that the copolymer is a TFE/HFP copolymer, the number of functional groups is 100 or more, the irradiation temperature is 180° C. to 250° C., and the exposure is 130 to 150 kGy, the coating can have a melt-deforming temperature 60° C. or more higher than the melting point.

As mentioned above, controlling the irradiation temperature and the exposure enables production of a coated electric wire that does not flow and deform even at a temperature 60° C. to 80° C. higher than the melting point.

The irradiation may be performed in any environment. The irradiation environment is preferably an environment having an oxygen concentration of 1000 ppm or lower, is more preferably free from oxygen, is still more preferably in vacuo or in an atmosphere of inert gas such as nitrogen, helium, or argon.

The coating may have any thickness, and may be 1 to 2000 μm, for example. The thickness of the coating may be 1000 μm or lower, or may be 100 μm or lower. The thickness may be as thin as 50 μm or lower. Making the coating thin is advantageous to achieve excellent heat-radiating performance.

The coating may further include polytetrafluoroethylene (PTFE). Containing PTFE enables an increase in the melt tension during melting, so that severance of the coating in molding can be suppressed, and the mechanical properties such as crack resistance, chemical resistance, and heat resistance can be further improved.

The PTFE to be added is a TFE homopolymer or a modified PTFE containing more than 99 mass % of TFE and less than 1 mass % of a modifying monomer. Examples of the modifying monomer include hexafluoropropylene (HFP), perfluoro(alkyl vinyl ethers) (PAVE), fluoroalkyl ethylenes, and chlorotrifluoroethylene (CTFE). One modifying monomer may be used, or two or more modifying monomers may be used.

The PTFE preferably has a melting point of 315° C. to 350° C.

The amount of the PTFE is preferably 0.01 to 60 mass %, more preferably 0.05 to 55 mass %, still more preferably 0.1 to 50 mass %, in the fluororesin mixture. The amount of the PTFE is preferably 20 mass % or less, more preferably 5 mass % or less, still more preferably 1 mass % or less, in the fluororesin mixture.

The coating may further include any other additional components, if necessary. Examples of the additional components include additives such as a crosslinker, an antistatic, a heat-resistance stabilizer, a foaming agent, a foam nucleating agent, an antioxidant, a surfactant, a photo-polymerization initiator, an abrasion inhibitor, a surface modifier, and a pigment.

The core wire may be formed of any material having good conductivity. Examples of the material include copper, copper alloys, copper-clad aluminum, aluminum, silver, gold, and zinc-plated iron. The core wire may be a single wire or a stranded wire.

The core wire may have any shape, and may have a circular shape or a flat shape. In the case of a circular conductor, the core wire may have any diameter. The diameter is suitably AWG8 to AWG54.

In the heat-resistant electric wire of the present invention, an additional layer may be disposed between the core wire and the coating or around the coating. For example, an external conductive metal layer may be formed around the coating, and a sheath layer may be further formed around the external conductive layer. An electric wire including an external conductor layer and a sheath layer disposed around the coating is suitably used as a coaxial cable. The sheath layer formed around the external conductor layer can also be formed from a modified fluorine-containing copolymer obtained by irradiating a copolymer with radiation.

The coating may be produced by any method, and the conditions thereof may be conventionally known ones. The coating may be formed directly on the core wire, or another layer, such as a resin layer, may be disposed in between.

For example, the coating may be produced by a method in which the copolymer is melt-extruded on the surface of the core wire or, if another resin layer is formed on the core wire in advance, on the surface of the resin layer, or a method in which the copolymer is melt-extruded to form a film in advance, the film is slit into a predetermined size, and the film is wound around the surface of the core wire or, if another resin layer is formed on the core wire in advance, around the surface of the resin layer.

Such a production method including extrusion-molding, on the core wire, at least one copolymer selected from the group consisting of a copolymer including a tetrafluoroethylene unit and a perfluoro(alkyl vinyl ether) unit and a copolymer including a tetrafluoroethylene unit and a hexafluoropropylene unit to form a coating that covers the core wire, and irradiating the coating with radiation is also one aspect of the present invention.

The extrusion-molding method for forming the coating on the core wire is known in the art. The conditions of irradiating the coating formed by extrusion molding are the same as the aforementioned conditions of irradiating the copolymer.

If the coating contains the copolymer and any other components such as PTFE, the coating is preferably formed on the core wire by extrusion-molding a mixture of the copolymer and the other components to cover the core wire.

The mixture of the copolymer and the other components is preferably prepared by any appropriately selected known method in accordance with the components to be added.

Specifically, if the coating contains the copolymer and PTFE, the method of producing a heat-resistant electric wire preferably include extrusion-molding, on the core wire, a mixture of the copolymer and PTFE to form a coating that covers the core wire, and irradiating the coating with radiation. The same extrusion-molding method and irradiation conditions as mentioned above can be applied here.

The heat-resistant electric wire of the present invention is suitable as an electric wire to be used in vehicles requiring heat resistance, such as automobiles, aircraft, and military vehicles. In particular, the heat-resistant electric wire of the present invention can be used as an electric wire to be used in aircraft, an electric wire arranged around an engine of an automobile, and a high-temperature sensor cable. Further, the heat-resistant electric wire of the present invention can exert excellent performance when used in high-temperature environments, such as thermal power plants or oil drilling.

For example, the heat-resistant electric wire includes a coating that does not immediately melt-deform even when exposed to a temperature of not lower than the melting point of the coating material, and thus exerts excellent performance.

EXAMPLES

Next, the present invention will be described in detail below with reference to, but not limit to, examples.

(Melting Point)

The melting point is a temperature corresponding to the maximum value on a heat-of-fusion curve obtained at a temperature-increasing rate of 10° C./min using a differential scanning calorimeter (DSC).

(Number of Functional Groups)

A sample was molten at 340° C. for 30 minutes, and then compression molded into a film having a thickness of 0.25 to 0.3 mm. This film was analyzed by scanning 40 times using a Fourier transform infrared (FT-IR) spectrometer (trade name: 1760X, PerkinElmer Co., Ltd.), and thereby an infrared absorption spectrum was obtained. Then, the difference spectrum was obtained between the infrared absorption spectrum and the base spectrum of a polymer that is completely fluorinated and is free from functional groups. With the absorption peak of a specific functional group appearing in this difference spectrum, the number N of the functional group per $1\times10^6$ carbon atoms in the sample was calculated according to the following formula (A):

$$N = I \times K / t \quad (A)$$

wherein

I: absorbance

K: correction coefficient t: thickness of film (mm).

For reference, Table 2 shows the absorption frequencies, molar absorption coefficients, and correction coefficients of the functional groups mentioned herein. The molar absorption coefficients are determined from the FT-IR measurement data of a low-molecular-weight model compound.

TABLE 2

| Functional group | Absorption frequency (cm$^{-1}$) | Molar absorption coefficient (l/cm/mol) | Correction coefficient | Model compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

The physical properties were determined by the following methods.

(Amount of Monomer Unit)

The amounts of the respective monomer units were determined by $^{19}$F-NMR.

(Melt Flow Rate (MFR))

The mass (g/10 min) of the polymer flowed out of a nozzle (inner diameter: 2 mm, length: 8 mm) per 10 minutes at 372° C. and 5 kg load was determined using a melt indexer (Yasuda Seiki Seisakusho Ltd.) in conformity with ASTM D1238.

(Glass Transition Temperature)

The glass transition temperature was determined by dynamic viscoelasticity measurement using DVA-220 (IT Keisoku Seigyo K.K.).

A compression molded sheet having a length of 25 mm, a width of 5 mm, and a thickness of 0.2 mm was used as a sample specimen, and the measurement was performed at a temperature-increasing rate of 5° C./min and a frequency of 10 Hz. The temperature corresponding to the tan δ peak was defined as the glass transition temperature.

(Crack Resistance: Winding Crack Test on Electric Wire)

Ten 20-cm-long electric wires were cut out of the resulting coated electric wire. These wires were used as electric wires (specimens) for a crack test. These specimens each in a straight state were heated at 260° C. for 96 hours.

Each specimen was taken out and cooled at room temperature, and then wound around an electric wire having the same diameter as the specimen. This workpiece was used as a sample. This sample was again heated at 260° C. for 1 hour. Then, the sample was taken out and cooled at room temperature, and the electric wire was straightened. The number of electric wires with cracking was counted visually and using a magnifier. If just a single crack was present in a single electric wire, this electric wire was evaluated as cracked. When the number of cracked electric wires was 1 or less among the 10 wires, this case was evaluated as good. When the number was 2 or more, this case was evaluated as poor.

(Heat Resistance: Dimensional Change Test on Electric Wire)

A 20-mm portion from the tip of the resulting coated electric wire was exposed and the remaining portion was covered with aluminum foil. This workpiece was used as a measurement sample. This sample was hung on a fence and heated in an electric furnace at a predetermined temperature of 310° C. for 60 minutes. Then, the sample was taken out of the electric furnace and cooled down to room temperature. The dimensional change of the electric wire due to melt deformation was checked. The evaluation method was as follows. Four outer diameters of the hung electric wire at the position 0.5 mm from the lower tip were measured before and after the heating. Electric wires satisfying (average outer diameter after heating)/(average outer diameter before heating)=1.04 or higher were defined as having a dimensional change. Alternatively, if visual observation found that the coating sagged to be longer than the conductor or the coating formed a thread-like stream, such electric wires were evaluated as having a dimensional change of the coating. In the tables, the evaluation "observed" means that the dimensional change was present, while the evaluation "not observed" means that the dimensional change was absent.

(Heat Resistance: Melt-Deformation Test on Electric Wire (Sagging))

A 20-mm portion from the tip of the resulting coated electric wire was exposed and the remaining portion was covered with aluminum foil. This workpiece was used as a measurement sample. This sample was hung on a fence and heated in an electric furnace from 300° C. to 390° C. in 10° C. increments. The sample was maintained at each temperature stage for 20 minutes. Then, the sample was taken out and the sagging thereof due to melt deformation was observed in the same manner as mentioned above. The temperature at which the dimensional change or the sagging was observed was defined as the melt deformation starting temperature (° C.) of the coating.

Example 1

A tetrafluoroethylene (TFE)/perfluoro(propyl vinyl ether) (PPVE) copolymer (polymer composition: TFE/PPVE=94.1/5.9 (mass %), MFR: 21 g/10 min, melting point: 303° C., glass transition temperature: 93° C., number of functional groups: 191 (per $10^6$ carbon atoms) (specifically, $CH_2OH$: 150, COF: 17, COOH: 24, other functional groups: 0)) used as a coating material was extrusion-molded through an extrusion-molding device at 380° C. to cover a 1.00-mm-diameter copper conductor with the coating thickness as mentioned below. Thereby, a coated electric wire was obtained.

The conditions of extrusion-molding the coating and of covering the electric wire are as follows.

a) Core conductor: 1.00-mm-diameter soft steel line
b) Coating thickness: 600 μm (for dimensional change and melt deformation tests), 280 μm (for winding crack test)
c) Coated electric wire diameter: 2.2 mm
d) Electric wire pulling rate: 20 m/min (600 μm), 30 m/min (280 μm)
e) Cone length: 30 mm
f) Extrusion conditions:
single-screw extrusion-molding device, cylinder shaft diameter=30 mm, L/D=22
die (inner diameter)/tip (outer diameter)=16.0 mm/10.5 mm
temperature setting of extruder: barrel portion C-1 (320° C.), barrel portion C-2 (360° C.), barrel portion C-3 (370° C.), lamp portion H (380° C.), die portion D-1 (380° C.), and die portion D-2 (380° C.); core wire pre-heating temperature: 80° C.

The resulting coated electric wire was cut into a length of 20 cm. The cut wire was contained in an electron beam irradiation container of an electron beam irradiator (NHV Corp.), and then nitrogen gas was put into the container so that the container was under nitrogen atmosphere. The temperature inside the container was adjusted to 25° C. After the temperature was stabilized, the front and back sides of the coated electric wire were irradiated with 20 kGy of electron beams at an electron beam accelerating voltage of 3000 kV and an exposure intensity of 20 kGy/5 min. The coated electric wire after the irradiation was subjected to the winding crack test and the heat resistance tests. Table 3 shows the results.

The heat resistance tests proved that the electric wire was not dimensionally changed even at a temperature of not lower than the melting point, and the coating did not sag due to melt flowing.

In conventional techniques, the coating may be deformed due to melt flowing or may be peeled off so that the performance of the electric wire may be impaired around the melting point. Still, the present invention enables production of a heat-resistant electric wire that is not easily heat-flowed or -deformed even at a temperature of not lower than the melting point of the material copolymer by irradiating the copolymer with radiation at a temperature of not higher than the melting point.

Examples 2 to 5

The winding crack test and the heat resistance tests were performed on the coated electric wire after the irradiation in the same manner as in Example 1 except that the electron beam irradiation was performed at an irradiation temperature and an exposure shown in Table 3.

Table 3 shows the results.

Comparative Example 1

The winding crack test and the heat resistance tests were performed on the resulting electric wire in the same manner as in Example 1 except that no electron beam irradiation was performed. Table 3 shows the results.

Examples 6 and 7 and Comparative Example 3

A TFE/PPVE copolymer (polymer composition: TFE/PPVE=93.9/6.1 (mass %), F content: 75.7 mass %, MFR: 25 g/10 min, terminals stabilized by fluorine gas, melting point: 304° C., glass transition temperature: 93° C., number of functional groups: 5 (per $10^6$ carbon atoms) (specifically, $CH_2OH$: 0, COF: 5, COOH: 0, other functional groups: 0)) was used as a coating material, and the winding crack test and the heat resistance tests were performed on the coated electric wire after the irradiation in the same manner as in Example 1 except that the electron beam irradiation was performed at an irradiation temperature and an exposure shown in Table 4. Table 4 shows the results.

Comparative Example 2

The winding crack test and the heat resistance tests were performed on the resulting electric wire in the same manner as in Example 6 except that no electron beam irradiation was performed. Table 4 shows the results.

Examples 8 to 10

A TFE/PPVE copolymer (polymer composition: TFE/PPVE=93.4/6.6 (mass %), F content: 74.6 mass %, MFR: 64 g/10 min, melting point: 284° C., glass transition temperature: 90° C., number of functional groups: 497 (per $10^6$ carbon atoms) (specifically, $CH_2OH$: 304, COF: 17, COOH: 152, $CF_2H$: 24, other functional groups: 0)) was used as a coating, and the winding crack test and the heat resistance tests were performed on the coated electric wire after the irradiation in the same manner as in Example 1 except that the electron beam irradiation was performed at an irradiation temperature and an exposure shown in Table 5. Table 5 shows the results.

Comparative Example 4

The winding crack test and the heat resistance tests were performed on the resulting electric wire in the same manner as in Example 8 except that no electron beam irradiation was performed. Table 5 shows the results.

Examples 11 and 12

A TFE/PPVE/HFP copolymer (polymer composition: TFE/PPVE/HFP=87.9/1.0/11.1 (mass %), F content: 75.9 mass %, MFR: 24 g/10 min, melting point: 257° C., glass transition temperature: 85° C., number of functional groups: 116 (per $10^6$ carbon atoms) (specifically, $CH_2OH$: 0, COF: 6, COOH: 10, $CF_2H$: 100, other functional groups: 0)) was used as a coating, and the winding crack test and the heat resistance tests were performed on the coated electric wire after the irradiation in the same manner as in Example 1 except that the electron beam irradiation was performed at an irradiation temperature and an exposure shown in Table 6. Table 6 shows the results.

Comparative Example 5

The winding crack test and the heat resistance tests were performed on the resulting electric wire in the same manner as in Example 11 except that no electron beam irradiation was performed. Table 6 shows the results.

TABLE 3

| | | | | Heat resistance tests | |
| --- | --- | --- | --- | --- | --- |
| | Irradiation temperature (° C.) | Exposure (kGy) | Winding crack test | Dimensional change | Melt deformation starting temperature of coating (° C.) |
| Comparative Example 1 | — | Not irradiated | Good | Not observed | 300 or lower |
| Example 1 | 25 | 20 | Good | Observed | 370 or higher |
| Example 2 | 80 | 40 | Good | Observed | 370 or higher |
| Example 3 | 200 | 20 | Good | Observed | 370 or higher |
| Example 4 | 245 | 20 | Good | Observed | 370 or higher |
| Example 5 | 245 | 40 | Good | Observed | 380 or higher |

TABLE 4

| | | | | Heat resistance tests | |
| --- | --- | --- | --- | --- | --- |
| | Irradiation temperature (° C.) | Exposure (kGy) | Winding crack test | Dimensional change | Melt deformation starting temperature of coating (° C.) |
| Comparative Example 2 | — | Not irradiated | Good | Not observed | 300 or lower |
| Example 6 | 245 | 20 | Good | Observed | 320 or higher |
| Example 7 | 245 | 40 | Good | Observed | 340 or higher |
| Comparative Example 3 | 245 | 300 | Poor | Not observed | 300 or lower |

TABLE 5

| | | | | Heat resistance tests | |
| --- | --- | --- | --- | --- | --- |
| | Irradiation temperature (° C.) | Exposure (kGy) | Winding crack test | Dimensional change | Melt deformation starting temperature of coating (° C.) |
| Comparative Example 4 | — | Not irradiated | Poor | Not observed | 300 or lower |
| Example 8 | 150 | 20 | Good | Observed | 360 or higher |
| Example 9 | 245 | 20 | Good | Observed | 380 or higher |
| Example 10 | 245 | 40 | Good | Observed | 380 or higher |

TABLE 6

| | Irradiation temperature (° C.) | Exposure (kGy) | Winding crack test | Dimensional change | Heat resistance tests — Melt deformation starting temperature of coating (° C.) |
|---|---|---|---|---|---|
| Comparative Example 5 | — | Not irradiated | Poor | Not observed | 300 or lower |
| Example 11 | 180 | 130 | Good | Observed | 320 or higher |
| Example 12 | 245 | 150 | Good | Observed | 320 or higher |

INDUSTRIAL APPLICABILITY

Since being excellent in heat resistance and crack resistance, the heat-resistant electric wire of the present invention is suitably used as an electric wire to be used in vehicles such as automobiles, aircraft, and military vehicles.

The invention claimed is:

1. A heat-resistant electric wire comprising a core wire and a coating that covers the core wire,
the coating being formed from a modified fluorine-containing copolymer that is obtained by irradiating a copolymer with radiation at an exposure of 90 kGy or lower at a temperature of not higher than the melting point of the copolymer,
wherein the copolymer including a tetrafluoroethylene unit and a perfluoro(alkyl vinyl ether) unit includes 2.0 to 12 mass % of the perfluoro(alkyl vinyl ether) unit in all the monomer units,
wherein the copolymer has 191 or more functional groups per $10^6$ carbon atoms and the functional groups include at least one selected from the group consisting of —CF=CF$_2$, —CF$_2$H, —COF, —COOH, —COOCH$_3$; —CONH$_2$, and —CH$_2$QH.

2. A method of producing the heat-resistant electric wire according to claim 1, comprising
extrusion-molding, on a core wire, a copolymer including a tetrafluoroethylene unit and a perfluoro(alkyl vinyl ether) unit to provide a coating that covers the core wire, and
irradiating the coating with radiation.

3. The production method according to claim 2, wherein the coating further contains polytetrafluoroethylene.

* * * * *